Nov. 26, 1929. L. A. GARY ET AL 1,736,783

MEASUREMENT OF ELECTRICAL RESISTANCE

Filed July 17, 1928

INVENTORS
L.A.Gary and H.G.Tasker
BY
ATTORNEY

Patented Nov. 26, 1929

1,736,783

UNITED STATES PATENT OFFICE

LAURENCE A. GARY, OF SAN FRANCISCO, AND HOMER G. TASKER, OF LOS ANGELES, CALIFORNIA, ASSIGNORS TO AMERICAN TELEPHONE AND TELEGRAPH COMPANY, A CORPORATION OF NEW YORK

MEASUREMENT OF ELECTRICAL RESISTANCE

Application filed July 17, 1928. Serial No. 293,444.

This invention relates to the measurement of electrical resistances, and more particularly to the measurement of very high electrical resistances.

In connection with electrical systems—for instance, telephone systems—it is necessary at times to ascertain with a fair degree of accuracy the values of resistances which are so high as to run into thousands of megohms. One or more devices suitable for field use are employed at the present time for making measurements of high resistances, and the degree of accuracy obtainable has been satisfactory with resistances as high as 1,000 megohms. There are cases, however, such as the measurement of the insulation resistances of short lengths of cable, in which the means in use at the present time do not give satisfaction because the resistance values not only exceed 1,000 megohms but may be twenty or twenty-five times that value.

The object of this invention is the provision of a suitable method of and suitable means for measuring resistances ranging from low values to 25,000 megohms or higher values.

A further object of the invention is the provision of means for measuring very high resistances with the use of a measuring voltage which is small in comparison with the measuring voltages which have been required heretofore in most of the devices employed for similar purposes.

Furthermore, it is an object of the invention to provide for resistance measurements which are more economically and more conveniently made than has been the case heretofore.

Since the applicants' measuring device is designed to measure resistances, among others, which are in excess of $10^9$ ohms, they choose to call their device the "begohmmeter" (one begohm equals 1,000 megohms).

In general, the applicants, in accomplishing the objects stated above, employ the Wheatstone bridge principle in a novel manner, the point of balance of the bridge network being determined by measuring separately the voltage drops across two arms of the bridge and adjusting the variable bridge arm so that the two voltage drops are equal.

The invention may be clearly understood from the following description of one desirable arrangement of the applicants' resistance measuring means. This description is to be read with reference to the accompanying drawing.

Figure 1:
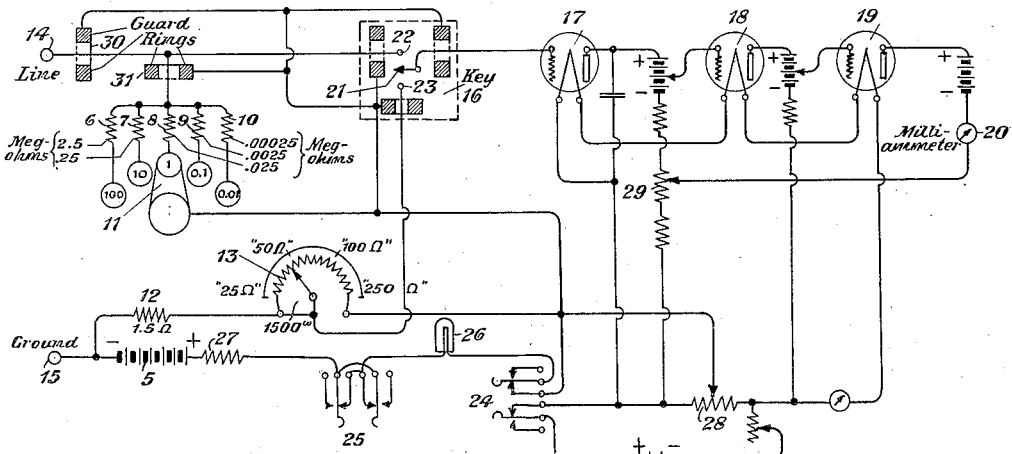
Figure 2:
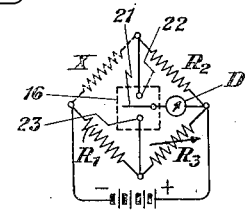
Figure 3:
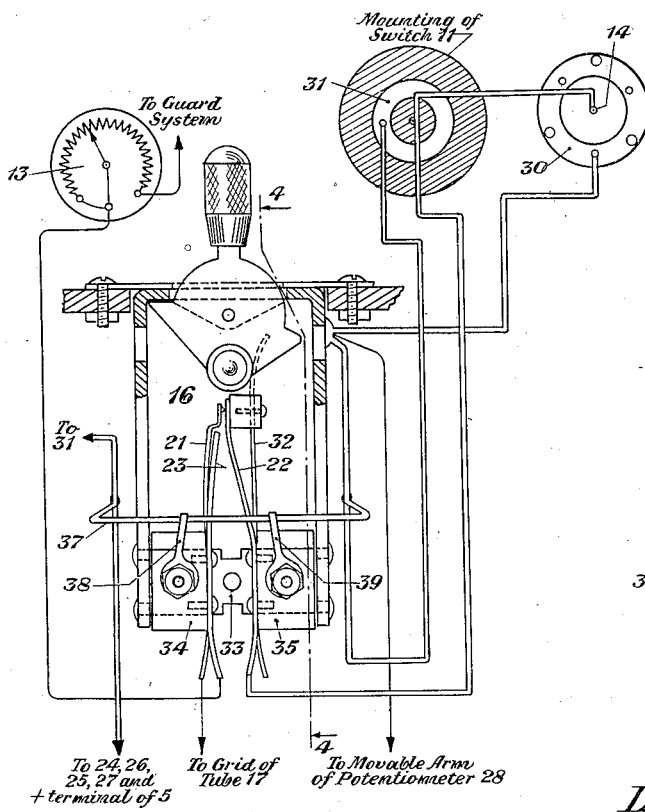
Figure 4:

Figure 1 of the drawing shows diagrammatically the general circuit arrangement of the invention; Fig. 2 indicates diagramatically the relation of the bridge arms and the voltage measuring device; Fig. 3 shows in side elevation a circuit making and breaking switch which is one of the details diagrammatically shown in Fig. 1 and indicates certain circuit connections, more clearly shown in Fig. 1; Fig. 4 shows a view taken on the line 4—4 of Fig. 3. Like numerals of reference in the several figures of the drawing designate corresponding parts.

With reference to the details of the drawing, and, first, with particular reference to Fig. 1, the resistance measuring system comprises a testing battery 5, which, for the purpose of clarity, may be assumed to supply a potential of approximately 250 volts, five resistance standards 6, 7, 8, 9 and 10, any one of which may be selected for use in the system by the operation of a multiplier switch 11, a circuit which may be termed the "comparison circuit" consisting of a fixed resistance 12 of 1.5 megohms in series with a 1,500 ohm potentiometer 13 bridged across the battery 5, and a highly sensitive three-stage vacuum tube amplifier capable of amplifying steady potentials, this amplifier arrangement having a milliammeter in the plate circuit of the last tube. The three vacuum tubes are labeled 17, 18 and 19, and the milliammeter is labeled 20. Terminals 14 and 15 are provided, and, on the assumption that the system is to be used for the measurement of insulation resistances, these terminals are marked "Line" and "Ground", respectively. A special highly insulated key 16 serves to impress the voltage drop in either one of two arms of the bridge on the vacuum tube amplifying arrangement, as will be more fully disclosed hereinbelow.

It is believed that the nature of the system and the arrangement of the elements of the circuits stated above and of certain other elements of the system will be best understood in connection with the following description of the general operation of the system:

The resistance, of unknown value, which is to be measured is connected across the terminals 14 and 15. A switch 24 is placed in the closed position diagrammatically indicated, and current flows from the battery 5 through a resistance 27, the switch 25 (discussed hereinafter), a lamp 26, the switch 24, one of the standard resistances 6, 7, 8, 9 or 10 (the selection being made, as indicated above, through the operation of the multiplier switch 11) and the unknown resistance back to the battery 5. Key 16 is thrown to the position which makes contact between 21 and 22, and the potential drop across the selected standard resistance is applied to the grid filament circuit of the first vacuum tube 17.

The vacuum tube circuits form a highly sensitive device for measuring changes in voltage. In order that sufficient sensitivity may be had without the use of vacuum tubes in addition to the three shown, the amplifier 17—18—19 is made regenerative by the return of the plate current of the third tube 19 through part of the resistance in the plate circuit of the first tube. The proper bias for the first tube 17 may be obtained by the use of a potentiometer 28 connected across the filament supply circuit, and the bias of each of the tubes 18 and 19 is obtained through the return of the grid of the tube to the proper tap on the plate battery which precedes that grid in the circuit. The milliammeter 20 serves to indicate the plate current of the last tube 19, and thus is an index of the voltage applied to the first tube 17. Any change in potential on the grid of the tube 17, though it be very small, will be indicated by a change in the reading of the milliammeter 20.

Reverting to the discussion of the operation of the system, when the potential drop across one of the standard resistances is applied to the tube 17 by the suitable operation of the key 16, the reading of the milliammeter 20 is noted. The key 16 is then thrown to the position which makes contact between 21 and 23, and there is applied to the tube 17 the voltage drop in the potentiometer 13 of the comparison circuit. Again, the indication of the meter 20 is noted, and the potentiometer 13 is then adjusted so that the deflection of the needle of the meter 20 is the same as that which was obtained when contact was made between 21 and 22 through key 16. The resistance of the potentiometer 13 after this adjustment may, by suitable calibration, be made to indicate the value of the unknown resistance in megohms when the reading is multiplied by a factor associated with the selected resistance standard, as will be more fully disclosed below.

It will be desirable now to clarify the description of the Wheatstone bridge circuit and the theory involved in its use, and, in this connection, reference should be had to Fig. 2 as well as to Fig. 1 of the drawing. In Fig. 2, a switch 16 and its contacts 21, 22 and 23 correspond to elements shown in Fig. 1; the battery shown represents the testing battery 5 of Fig. 1; D represents the vacuum tube amplifier voltmeter; X represents the resistance to be measured; $R_1$ represents the fixed resistance 12; $R_2$ represents the standard resistance (6, 7, 8, 9 or 10), and the variable resistance $R_3$ represents the variable resistance of the potentiometer 13 which is to be calibrated in megohms. Since the method of measurement involves the adjustment of the resistance $R_3$ so that D gives like readings for the two positions of the key 16, there is, after the adjustment, the condition of balance in the Wheatstone bridge, that is, there is zero difference of potential as the key is thrown from one position to the other and $$\frac{X}{R_1} = \frac{R_2}{R_3} \quad (1)$$

Correspondingly, $$X = \frac{R_2 \times R_1}{R_3} \quad (2)$$

or $$R_3 = \frac{R_2 \times R_1}{X} \quad (3)$$

From equation (2) it is seen that X is determined if $R_1$, $R_2$ and $R_3$ are known, whatever may be the characteristics of the device D.

By the use of equation (3), the resistance $R_3$ (potentiometer 13) may be calibrated and the associated scale marked to facilitate the reading of the unknown resistance value. Suitable values of $R_1$ and $R_2$ having been established or selected, the value of $R_3$ may be determined for any given value of X. For example, if $$R_1 = 1.5 \times 10^6 \text{ ohms,}$$
$$R_2 = 2.5 \times 10^6 \text{ ohms, and}$$
$$X = 25 \times 10^9 \text{ ohms,}$$

then $$R_3 = \frac{2.5 \times 1.5 \times 10^{12}}{25 \times 10^9} \text{ ohms}$$

which equals 150 ohms.

Since the given value of X in this example is 25,000 megohms, or 25 begohms, the corresponding point on the scale of $R_3$ (potentiometer 13) might be marked with the value of X expressed either in megohms or begohms. However, the operation of the device will be simplified if this point on the scale is marked "250 megohms" (see Fig. 1), and a multiplier indication "100" is assigned to the multiplier switch contact which connects the 2.5 megohm value (resistance 6) in the circuit. It will be noted in Fig. 1 that the standard resistances 6, 7, 8, 9 and 10 have the values 2.5, .25, .025, .0025 and .00025, respectively, and that the corresponding contacts bear the multiplier numbers of "100", "10", "1", "0.1" and "0.01", respectively.

The vacuum tube arrangement 17—18—19, with the associated circuits, is best referred to as an amplifier voltmeter. In order that voltage drops involving minute current values may be measured without a reaction on the circuit which is being measured, the indicating instrument should be one having a very high—practically infinite—input impedance and high sensitivity. A vacuum tube amplifier adapted and arranged as indicated in Fig. 1 is a desirable form of indicator. As stated above, the amplifier disclosed in the drawing is a three-stage device capable of amplifying steady potentials. It will be noted that a metallic circuit exists between the plate of one tube and the grid of the next tube and that the grid of the second tube 18 is returned to a suitable tap on the plate battery of the first tube 17. This tap should be selected so that the voltage between it and the negative end of the filament of the tube 18 is approximately −1 volt (for the circuit and tube shown by way of illustration), the drop in the plate circuit resistances being taken into account.

If a current flows through one of the standard resistances 6, 7, 8, 9 or 10 (with the key 16 in the appropriate position), the resulting voltage is applied to the grid of tube 17, and, as will be noted, the polarity of the battery 5 is such that this voltage will make the grid of tube 17 more negative than it is normally. Accordingly, the plate current of the first tube 17 is reduced, and, because of this reduction in plate current, the voltage drop in the plate circuit resistance is reduced, and the potential of the grid of tube 18 will be correspondingly increased positively. The increase of grid potential in tube 18 causes an increase in the plate current of that tube, and this increase results in a reduction of the potential on the grid of tube 19. Therefore, the plate current of the third tube 19 is reduced in an amount determined by the voltage applied to the first tube. This plate current of tube 19 flows through the milliammeter 20, and, as will readily be understood, is used as an indication of the input voltage of the amplifier.

Several factors control the selection of the resistance standards to be used as multipliers for the input circuit. The resistance must be high enough to provide for the development by the minute testing current of a potential sufficient to operate the vacuum tube amplifier. Thus, it is seen that the resistance value to be selected depends upon the sensitivity of the amplifier, the range of the resistance measurement contemplated and the most desirable voltage which is available. However, this standard resistance must not be high enough to introduce difficulties from leakage. With a suitable insulating system, to be discussed hereinafter, resistance values as high as 10 megohms may be used with satisfaction. In addition, of course, the material employed for the construction of the resistors affects the standard resistance values which may be utilized.

A suitalbe insulating system is important if the applicants' device is to give satisfactory results. Surface leakage, for instance, between the terminals 14 and 15 will be in parallel with the measured external resistance (X) and may seriously affect the accuracy of the reading. The applicants prefer to use the guard system diagrammatically shown in Fig. 1 and shown in part in Fig. 3. A guard ring 30 is placed about the terminal 14 and a second guard ring 31 is associated with the multiplier switch 11 as shown. These guard rings are connected to the positive pole of the testing battery 5. With this arrangement, any surface leakage is picked up by one of the guard rings, and the only difference of potential existing between the guard ring 30, for instance, and the terminal 14 is that which is due to the current flowing in one of the standard resistances. Accordingly, any insulating material having a resistance which is high compared to the value of the standard resistance will be satisfactory.

It is important that the key 16 be guarded in a manner similar to that in which the terminal 14, for instance, is guarded. A suitable switch, which is not only highly insulated but is also of the quick-acting type desirable, is shown in some detail in Figs. 3 and 4 of the drawing. The switch disclosed is a telephone key of the lever type so modified that suitable insulation is provided. In the normal position of the key, a contact strip 21 makes contact with a second contact spring 22. When the key lever is thrown from its normal position, the contact 21—22 is broken and contact is made between 21 and another spring 23. The spring 32, in the form of switch specifically disclosed, acts merely as a restoring spring. Each of the springs 21, 22, 23 and 32 is mounted on a separate piece of insulating material which is supported directly by the key frame 33; for instance, the spring 23 is mounted on an insulating block 34. Likewise, the drawing shows that springs 22 and 32 are mounted on insulating blocks 35 and 36, respectively. The key frame 33 is connected through members 38 and 39 to the guard system, a part of which is shown as 37 in Fig. 3. For the purpose of clarity, the connections of the contact springs 21, 22 and 23 and of the guard system are indicated in Fig. 3.

The form of highly insulated switch shown in Figs. 3 and 4 and a modification thereof are disclosed and claimed in the applicants' application filed of even date herewith and given Serial Number 293,445.

If a test is being made of a pair of conductors and the pair under test happens to be short-circuited, it is likely that the battery 5 will become exhausted. Accordingly, it is desirable that a lamp 26 be included in the circuit as shown to indicate that there is a short circuit or that the resistance connected between the terminals 14—15 is very low due to any cause. The resistance 27 serves to limit the current through the lamp 26. The switch 25, which may be termed the "foreign potential switch" permits the opening of the testing battery circuit independently of the filament circuit of the vacuum tubes.

The potentiometer 29 shown in Fig. 1 may be used for the adjustment of the vacuum tube circuits to produce stability of the amplifier.

While the invention has been disclosed in a specific embodiment for the purpose of illustration, it is to be understood that the scope of the invention is not limited thereby, but is determined by the appended claims.

What is claimed is:

1. An electrical system for measuring the unknown value of a resistance, comprising a fixed resistance, a variable resistance, a plurality of standard resistances, means for connecting any one of said standard resistances in circuit with said fixed resistance and said variable resistance, means for connecting the resistance of unknown value in a Wheatstone bridge arrangement with said fixed resistance, said variable resistance and the selected one of said standard resistances, means for supplying current to the Wheatstone bridge so formed, means for detecting potential drops, and circuit arrangements for connecting said detecting means across either the selected one of said standard resistances or said variable resistance.

2. An electrical system for measuring the unknown value of a resistance, comprising a fixed resistance, a variable resistance, a plurality of standard resistances, means for connecting any one of said standard resistances in circuit with said fixed resistance and said variable resistance, means for connecting the resistance of unknown value in a Wheatstone bridge arrangement with said fixed resistance, said variable resistance and the selected one of said standard resistances, means for supplying current to the Wheatstone bridge so formed, means for detecting potential drops, means for connecting said detecting means across either the selected one of said standard resistances or said variable resistance, and circuit arrangements for preventing leakage currents from affecting the bridge measurement.

3. An electrical system for measuring the unknown value of a resistance, comprising a fixed resistance, a variable resistance, a plurality of standard resistances, means for connecting any one of said standard resistances in circuit with said fixed resistance and said variable resistance, means for connecting the resistance of unkown value in a Wheatstone bridge arrangement with said fixed resistance, said variable resistance and the selected one of said standard resistances, means for supplying current to the Wheatstone bridge so formed, means for detecting potential drops, means for connecting said detecting means across either the selected one of said standard resistances or said variable resistance, and circuit arrangements for preventing leakage currents from flowing in the system in parallel with the resistance of unknown value.

4. An electrical system for measuring the unknown value of a resistance, comprising a fixed resistance, a variable resistance, a plurality of standard resistances, means for connecting any one of said standard resistances in circuit with said fixed resistance and said variable resistance, means for connecting the resistance of unknown value in a Wheatstone bridge arrangement with said fixed resistance, said variable resistance and the selected one of said standard resistances, means for supplying current to the Wheatstone bridge so formed, means for detecting potential drops, said means having very high input impedance and high sensitivity, and circuit arrangements for connecting said detecting means across either the selected one of said standard resistances or said variable resistance.

5. An electrical system for measuring the unknown value of a resistance, comprising a fixed resistance, a variable resistance, a plurality of standard resistances, means for connecting any one of said standard resistances in circuit with said fixed resistance and said variable resistance, means for connecting the resistance of unknown value in a Wheatstone bridge arrangement with said fixed resistance, said variable resistance and the selected one of said standard resistances, means for supplying current to the Wheatstone bridge so formed, means for detecting potential drops, said means having very high input impedance and high sensitivity, means for connecting said detecting means across either the selected one of said standard resistances or said variable resistance, and circuit arrangements for preventing leakage currents from flowing in the system in parallel with the resistance of unknown value.

6. The method of measuring a resistance of unknown value, which consists in including the unknown resistance in a Wheatstone bridge as one of the arms thereof along with two known fixed resistances and a variable resistance, applying a steady potential to the bridge, measuring the voltage drop across one of the fixed resistances, measuring the voltage drop across the variable resistance, adjusting the variable resistance so that the voltage drop thereacross equals the determined voltage drop across the fixed resistance, and ascertaining the value of the unknown resistance from the relation of the known and determined values.

In testimony whereof, I have signed my name to this specification this 3rd day of July, 1928.

LAURENCE A. GARY.

In testimony whereof, I have signed my name to this specification this 5th day of July, 1928.

HOMER G. TASKER.